(12) United States Patent
Lyu

(10) Patent No.: US 6,654,500 B1
(45) Date of Patent: Nov. 25, 2003

(54) MPEG VIDEO DECODING SYSTEM AND OVERFLOW PROCESSING METHOD THEREOF

(75) Inventor: Hwa Young Lyu, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/221,823

(22) Filed: Dec. 28, 1998

(30) Foreign Application Priority Data

Dec. 29, 1997 (KR) .............................................. 97/77142

(51) Int. Cl.[7] .......................... G06K 9/36; H04N 11/02; H04B 1/66
(52) U.S. Cl. ................. 382/233; 348/419.1; 348/423.1; 348/425.2; 375/240.01; 375/240.25; 375/240.26; 375/240.27
(58) Field of Search ................................ 382/232, 233, 382/234, 236, 237, 238, 239, 240, 241, 242, 243; 348/384, 423.1, 419.1, 425.2; 375/240.01, 240.27, 240.26, 240.28, 240.29, 240.25

(56) References Cited

U.S. PATENT DOCUMENTS

| 5,521,922 A | | 5/1996 | Fujinami et al. | |
|---|---|---|---|---|
| 5,565,924 A | * | 10/1996 | Haskell et al. | ............... 348/423 |
| 5,673,358 A | | 9/1997 | Boyce | |
| 5,754,241 A | * | 5/1998 | Okada et al. | ............... 348/419 |
| 5,898,695 A | * | 4/1999 | Fujii et al. | ............... 370/464 |
| 5,966,385 A | * | 10/1999 | Fujii et al. | ............... 370/465 |
| 6,151,441 A | * | 11/2000 | Kawamura et al. | ............... 386/95 |

* cited by examiner

Primary Examiner—Andrew W. Johns
Assistant Examiner—Amir Alavi
(74) Attorney, Agent, or Firm—Fleshner & Kim, LLP

(57) ABSTRACT

An MPEG video decoding system and an overflow processing method are disclosed. The MPEG video decoding system does not reset the video buffer during the overflow period, which allows a decoding of the data already stored in the video buffer, thereby minimizing the loss of data due to an overflow.

35 Claims, 3 Drawing Sheets

MPEG VIDEO DECODING SYSTEM AND OVERFLOW PROCESSING METHOD THEREOF

BACKGROUND OF THE INVENTION

1. Field of the Invention

The present invention relates to a moving picture expert group (MPEG) video decoder, and more particularly to an overflow processing for the MPEG video decoding system.

2. Discussion of the Related Art

Recently, digitalization of information has already been developed extensively. As a result, the picture compressing technology is becoming the major concern for multimedia. An MPEG is the international standard for coding the digital data of moving picture and is considered as the most effective compressing technology in the multimedia environment. The MPEG technology is widely used as the compressing algorithm in communication, broadcasting, game and the like including a digital TV.

The MPEG video compressing algorithm is based upon two elementary technologies. A motion estimation and compensation of the video in block units is used to reduce the temporal redundancy. Also, a discrete cosine transform (DCT) is used to reduce the spatial redundancy.

The DCT transformed video data signal is quantized into a set number of bits to reduce the total amount of data. The quantized data is processed through a variable length coding (VLC) which codes a frequently occurring value by a smaller number of bits and an occasionally occurring value by a larger number of bits, thereby reducing the entire number of bits. A motion vector of 16×16 block is obtained is transferred together with the DCT coefficient data.

A digital TV utilizing the MPEG technology includes a tuner, a demultiplexer, a video decoder and a monitor. The tuner selects one of a plurality of channel signals received through an antenna and demodulates the signals. The demultiplexer selects a desired program from a plurality of programs included in the selected channel and divides the program into packets of audio and video bit streams.

The video bit streams are coded at a variable rate by the VLC, temporarily stored in a video buffer and output to the video decoder at a fixed rate. The video decoder eliminates any overhead, such as various header data and a initial code, from the input video bit streams. The video decoder also restores the data to the original pixel value through a variable length decoding (VLD), an inverted DCT (IDCT), and a motion compensation using the motion vector. The restored pixel value is output to the monitor.

During the course of decoding, a temporary overflow may occur in the video buffer due to errors, particularly when the rate of data stored in the video buffer is faster than the rate of data read by the video decoder. In the background art, an overflow in the video buffer is regarded as a fatal error and the video buffer is reset. As a result, the video bit streams stored thus far in the video buffer are all erased and must be newly stored in the video buffer.

Thus, if an overflow occurs, the video buffer fails to store the video bit streams and the demultiplexer discards the video bit streams. If the video buffer is reset, the demultiplexer again stores the video bit streams in the video buffer. Meanwhile, the video decoder sits idle because of the discontinuity in the video bit streams output to the video decoder due to an overflow in the video buffer. Moreover, the video decoder does begin decoding until the sequence header is searched and found even though when the video bit streams are newly stored in the video buffer.

In the background art, whenever an overflow occurs in the video buffer, the video buffer is reset to erase all the video bit streams stored in the video buffer. In addition, the video decoder does not begin decoding until the sequence header is searched even though new video bit streams are stored again in the video buffer and input to the video decoder. For these reasons, the overflow causes a loss in several tens of frames of picture data.

SUMMARY OF THE INVENTION

Accordingly, an object of the present invention is to solve at least the problems and disadvantages of the related art.

An object of the present invention is to minimize losses of video bit streams in the overflow processing of a MPEG video decoding system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a MPEG video decoding system includes a video buffer temporarily storing video bit streams compressed for decoding and outputting a signal indicative of an overflow if an overflow occurs; and a demultiplexer demultiplexing and storing the video bit streams in the video buffer, discarding the video bit streams without storing the bit streams if the signal indicative of overflow is input from the video buffer, and begin storing the demultiplexed video bit streams in the video buffer if a signal indicative of non-overflow is input from the video buffer.

In an another embodiment of an MPEG video decoding system according to the present invention also includes a video decoder which stops decoding until a code indicating a capability of performing normal decoding is detected if an error code is detected in the course of decoding, and outputting pixel data of pictures to a display portion.

In an another embodiment of an overflow processing method in an MPEG video decoding system according to the present invention includes the steps of indicating an overflow if an overflow occurs in a video buffer, discarding the demultiplexed video bit streams without storing them in the video buffer if a signal indicating an overflow is input from the video buffer, indicating a non-overflow when an overflow of the video buffer is eliminated, and begin storing the demultiplexed video bit streams in the video buffer when a signal indicative of non-overflow is input.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
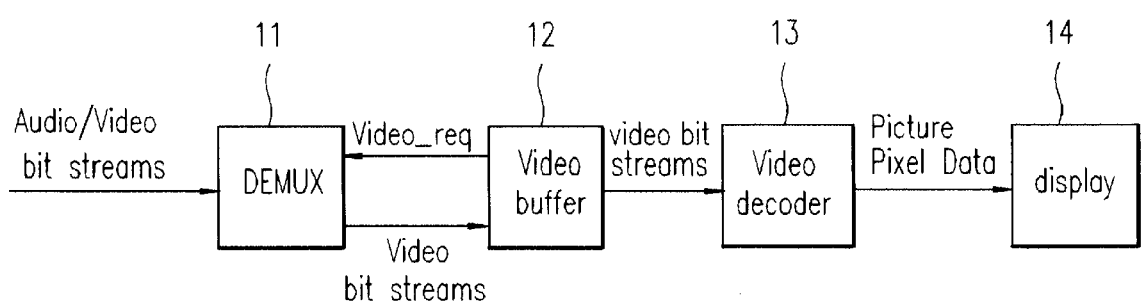
FIG. 1 is a block diagram of a MPEG video decoding system according to the present invention.

FIG. 1 shows a preferred embodiment of a MPEG video decoding system according to the present invention including a video buffer 12 temporarily storing the compressed video bit streams prior to the decoding; a demultiplexer (DEMUX) 11 demultiplexing and storing the video bit streams of the multiplexed bit streams including the audio and video bit streams in the video buffer 12; a video decoder 13 receiving and decoding the video bit streams; and a display 14 receiving and displaying the picture pixel data from the video decoder 13.

The DEMUX 11 discards the video bit streams without storing the video bit streams in the video buffer 12 if a signal indicating an overflow is input from the video buffer 12. Upon receiving the signal indicative of an overflow, the DEMUX 11 inserts an error code into the demultiplexed video bit streams which allows a unique decoding. When a signal indicating a non-overflow is input from the video buffer 12, the DEMUX 11 inserts a code indicating a capability to perform normal decoding and continues to store the demultiplexed video bit streams in the video buffer 12.

When an error code is detected, the video decoder 13 stops decoding the output from the video buffer 12 until a code indicating capability to perform normal decoding is detected. The video decoder 13 continues normal decoding upon detecting the code indicating capability to perform normal decoding and outputs the pixel data of pictures. Thus, the display 14 displays the pixel data of pictures decoded by the video decoder 13 on a viewing screen.

The video buffer 12 informs the DEMUX 11 if an overflow of the video bit streams has occurred using a Video_req signal. For example, if the video bit streams are in the overflow state, the video buffer 12 outputs a signal Video_req '1' to the DEMUX 11. When the system recovers from the overflow state, the video decoder 12 outputs a signal Video_req '0' to the DEMUX 11. More importantly, the video buffer 12 is not reset by an overflow, but simply stops storing the video bit streams, thereby continuing to output the video bit streams to the video decoder 13.

Thus, for decoding the video bit streams, the DEMUX 11 demultiplexes the video bit streams from the multiplexed audio and video bit streams. The demultiplexed video bit streams are output to the video buffer 12 which temporarily stores the compressed data at a variable rate for decoding and outputs the data to the video decoder 13 at a fixed rate. The video decoder 13 decodes the compressed video bit streams by eliminating overheads, such as various header data and an initial code, from the input video bit streams. The video decoder 13 restores the data to the original pixel value of the screen through the VLD, the dequantization, the IDCT, and the motion compensation using a motion vector. The restored pixel value of the picture is output to the display 14.

Figure 2:
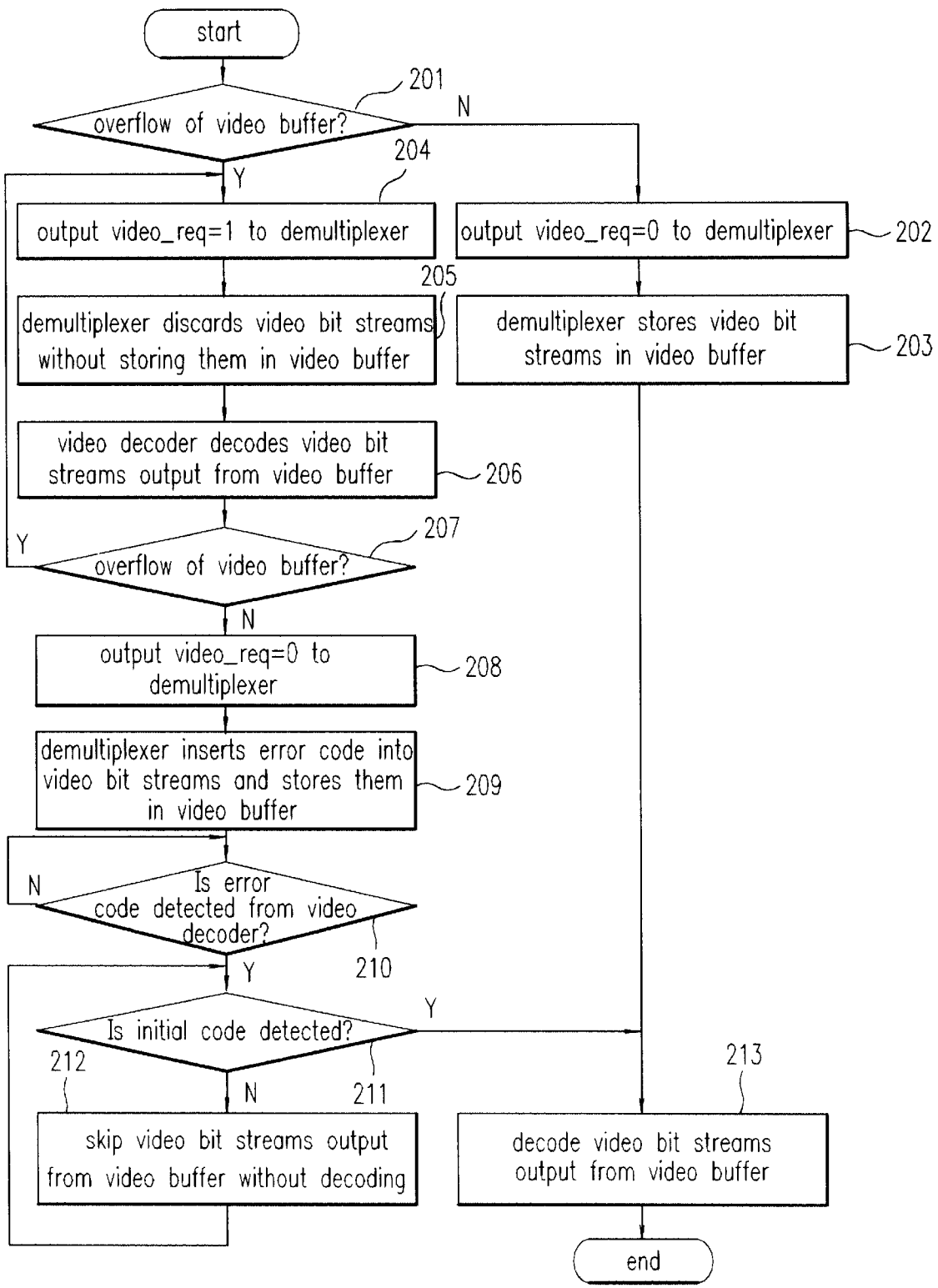
FIG. 2 is a flow chart of an overflow processing method of a MPEG video decoding system according to the present invention.

FIG. 2 shows an overflow processing in the MPEG video decoding system according to the present invention. During the decoding process, the video buffer 12 determines if an overflow of the bit streams has occurred (step 201) and informs the result of the determination to the DEMUX 11 using the Video-req signal. If the bit streams are in an overflow state, the video buffer 12 outputs the Video_req signal '1' to the DEMUX 11 (step 204). If the bit streams are not in an overflow state, the video buffer 12 outputs the Video-req signal '0' to the DEMUX 11 (step 202). The DEMUX 11 demultiplexes the video bit streams from the multiplexed bit streams if the Video_req signal is '0' and stores the bit streams to the video buffer 12 (step 203).

However, if the Video_req signal input to the DEMUX 11 is '1' indicating an overflow state of the video bit streams, the video buffer 12 cannot store additional video bit streams. Accordingly, upon receiving the Video_req signal '1,' the DEMUX 11 simply discards the video bit streams and does not output the data to the video buffer 12 (step 205). At this time, the video buffer 12 is not reset and continues to output the video bit streams already stored therein to the video decoder 13, and the video decoder 13 continues to decode the input video bit streams (step 206).

The video buffer 12 will eventually become empty and recover from the overflow state (step 207) as the video decoder 13 continues to decode the video bit streams stored in the video buffer 12. Upon recovery from the overflow state, the video buffer 12 outputs the Video_req signal '0' to the DEMUX 11 (step 208). When the Video-req signal becomes '0,' the DEMUX 11 inserts an error code into the demultiplexed video bit streams to inform the video decoder 13 of a discontinuity in the video bit streams. The video bit streams with the error code is output to the video buffer 12 (step 209). Once the overflow state is eliminated, the DEMUX begins to demultiplex and output the video bit streams to the video buffer 12.

The error code used by the DEMUX 11 is an unique code allowing the video decoder 13 to decode regardless of an error code insertion into any location within the video bit stream sequence. In the preferred embodiment, a sequence error code of the MPEG is utilized as the error code. Using the sequence error code simplifies the system because the sequence error code of the MPEG is determined depending on the MPEG standard. However, any other code capable of allowing the video decoder to recognize discontinuity of the video bit streams due to overflow may be implemented.

If an error code is detected from the video bit streams in the course of the normal decoding (step 210), the video decoder 13 stops decoding the video bit streams output from the video buffer 12 and searches for a code indicating a capability of performing normal decoding (step 212). The code indicating a capability of performing normal decoding is inserted into a location of the sequence from which the decoding may be performed. When the code indicating a capability of performing normal decoding is detected (step 211), the video decoder 13 continues the normal decoding (step 213).

Figure 3A:
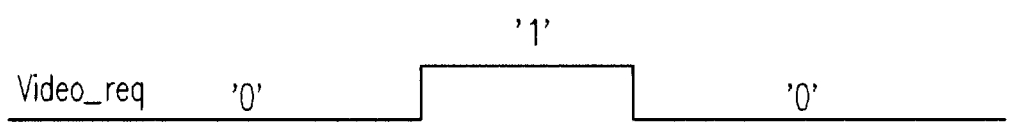
FIGS. 3a and 3b are timing charts of the operation during an overflow of a video buffer according to the present invention.
Figure 3B:
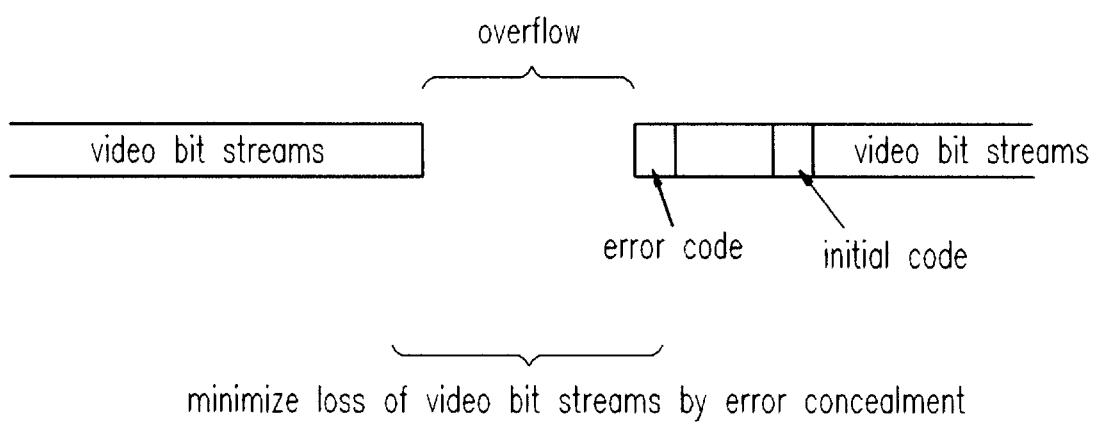

Referring to FIGS. 3a and 3b, an error concealment is performed for the video bit streams during the period of an overflow. By discarding the portion of the video bit streams corresponding to the period of overflow without resetting the video buffer 12, the video decoder 13 continues the decoding of the data already stored in the video buffer 12 during the period of overflow. The video buffer 12 only stops decoding when an error code is detected, and continues to decode when a code indicating a capability of normal decoding is detected.

In the preferred embodiment, the code indicating a capability of normal decoding is the initial code of the MPEG. By utilizing the initial code of the MPEG as the code indicating a capability of normal decoding, the video decoder 13 need not wait until the header of the video bit streams to begin decoding. Therefore, a minimal portion of video data streams corresponding to the period of overflow would be discarded without being decoded.

As aforementioned, the MPEG video decoding system and the overflow processing method thereof have the following advantages. Although the demultiplexer discards the data during the overflow, the video buffer 12 is not reset and which reduces the loss of the video bit streams. Also, because the discontinuity of the video bit streams due to an overflow of the video buffer is promptly determined and normal decoding is continued at the next initial code, it is unnecessary to wait until the sequence header is detected. As a result, loss of the video bit streams is further reduced. Furthermore, implementing the MPEG video decoding system according to the present invention to a digital TV improves the performance of the digital TV.

Therefore, in the MPEG video decoding system and the overflow processing method according to the present invention, the DEMUX discards the video bit streams without resetting the video buffer when a signal indicating an overflow is input from the video buffer. The video decoder continues to perform decoding the video bit streams output from the video buffer. If an error code is detected, the video decoder detects discontinuity of the video bit streams due to overflow of the video buffer and stops decoding until the code indicating a capability of performing normal decoding is detected. As a result, the video decoding skips performing a minimum amount of video bit streams when an overflow occurs in the video buffer, thereby minimizing the loss of picture data due to an overflow of the video buffer.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An MPEG video decoding system, comprising:
    a video buffer coupled to store a received video bit stream and configured to output a control signal, the control signal indicating overflow if an overflow condition occurs in the video buffer and otherwise indicating non-overflow; and
    a DEMUX coupled to output the video bit stream to the video buffer and receive the control signal from the video buffer, said DEMUX configured to discard the video bit stream if the control signal indicates overflow and to output the video bit stream to the video buffer if the control signal indicates non-overflow, wherein if the control signal indicating non-overflow is received subsequent to the control signal indicating overflow, upon resuming outputting of the video bitstream, the DEMUX inserts an error code into the video bit streams upon resuming outputting the video bit streams to the video buffer.

2. The system of claim 1, wherein the video buffer is not reset if an overflow occurs.

3. The system of claim 1, wherein the error code is a sequence error code.

4. The system of claim 1, further comprising a video decoder coupled to receive and decode the video bit streams stored in the video buffer, wherein the video decoder skips decoding of the video bit streams if the error code is detected from the stored video bit stream.

5. The system of claim 4, wherein the DEMUX inserts a code indicating a normal decoding after the insertion of the error code.

6. The system of claim 5, wherein the video decoder continues decoding of the video bit streams when the code indicating a normal decoding is detected from the stored video bit stream.

7. The system of claim 5, wherein the code indicating a normal decoding comprises an initial code.

8. The system of claim 1, wherein the error code is inserted into the video bit streams after recovering from an overflow condition to indicate a discontinuity in the video bit streams.

9. The system of claim 1, further comprising a video decoder coupled to receive and decode the video bit streams stored in the video buffer, wherein the video decoder skips the decoding of the video bit streams if an overflow condition is detected.

10. The system of claim 9, wherein the video decoder skips decoding when the video buffer resumes outputting of the video bit stream, including the inserted error code, after the overflow condition is corrected, and wherein the video decoder resumes decoding when an initialization code is received in the video bitstream subsequent to the error code.

11. An MPEG video decoding system comprising:
    a video buffer configured to store video bit streams, said video buffer outputting a control signal indicating overflow if an overflow occurs and otherwise indicating non-overflow;
    a DEMUX coupled to receive and demultiplex an input video bit stream and coupled to receive the control signal, wherein said DEMUX discards the video bit streams if the control signal indicates overflow and outputs the video bit streams to the video buffer if the control signal indicates non-overflow; and
    a video decoder coupled to receive an output of the video buffer and decode the received video bit streams, and wherein the video buffer is not reset if an overflow occurs, wherein the DEMUX inserts an error code into the video bit streams prior to outputting the video bit streams to the video buffer when the signal indicating non-overflow is received from the video buffer subsequent to receiving the signal indicating an overflow, and wherein the DEMUX inserts a code indicating a normal decoding after the insertion of the error code.

12. The system of claim 11, wherein the video decoder skips decoding of the video bit streams if the error code is detected from the stored video bit streams and wherein the video decoder resumes decoding of the video bit streams when the code indicating a normal decoding is detected from the stored video bit stream.

13. The system of claim 12, wherein the error code is a sequence error code.

14. The system of claim 13, wherein the code indicating a normal decoding is an initial code.

15. The method of claim 14, further comprising one of decoding the video bit streams stored in the video buffer and the skipping the decoding of the video bit streams stored in the video buffer, wherein the decoding is skipped when the control signal indicates overflow.

16. The system of claim 11, wherein the error code is inserted into the video bit streams after recovering from an overflow condition to indicate a discontinuity in the video bit streams.

17. The system of claim 11, further comprising a video decoder coupled to receive and decode the video bit streams stored in the video buffer, wherein the video decoder skips the decoding of the video bit streams if an overflow condition is detected.

18. An overflow processing method of an MPEG video decoding system, comprising:
    storing video bit streams in a video buffer for decoding, and generating a control signal to indicate overflow if an overflow occurs and otherwise to indicate non-overflow;

receiving the control signal in a demultiplexer; and receiving and demultiplexing an input video bit stream in the demultiplexer and one of discarding the video bit stream and outputting the video bit stream to the video buffer, wherein the video bit stream is discarded if the control signal indicates overflow, and wherein the video bit stream is outputted to the video buffer if the control signal indicates non-overflow, wherein demultiplexing the video bit streams further comprises inserting an error code into the video bit streams upon resuming outputting the video bit streams to the video buffer when the signal indicating non-overflow is received from the video buffer subsequent to the signal indicating overflow.

19. The method of claim 18, wherein the error code is a sequence error code.

20. The method of claim 18, further comprising:

decoding the video bit streams stored in the video buffer;

detecting whether the error code has been inserted into the video bit streams; and skipping decoding of the video bit streams if the error code is detected from the stored video bit stream.

21. The method of claim 20, further comprising inserting a code indicating a normal decoding into the demultiplexed bit stream subsequent to the insertion of the error code.

22. The method of claim 21, wherein the decoding step further comprises:

detecting the code indicating a normal decoding; and continuing decoding of the video bit streams when the code indicating a normal decoding is detected from the stored video bit stream.

23. The method of claim 22, wherein the code indicating a normal decoding is an initial code.

24. The method of claim 18, wherein the error code is inserted into the video bit streams after recovering from an overflow condition to indicate a discontinuity in the video bit streams.

25. An MPEG video decoding system, comprising:

an input circuit, coupled to receive a data stream and a control signal, and configured to output or discard a video bit stream according to the control signal; and a buffer, coupled to receive the video bit stream from the input circuit and output the video bit stream at a constant rate; and a decoder coupled to receive the video bit stream from the buffer, wherein the decoder stops decoding the video bit stream if the error code is detected in the video bit stream, and resumes decoding when a normal status code is detected in the video bit stream, wherein the buffer generates the control signal indicating an available or unavailable state of the buffer and provides the control signal to the input circuit, and wherein the input circuit discards the video bit stream output when the buffer is in the unavailable state, and wherein the input circuit inserts an error code into the video bit stream when the control signal is returned to the available state after being in the unavailable state and resumes outputting the video bitstream including the error code.

26. The system of claim 25, wherein the input circuit comprises a demultiplexer.

27. The system of claim 25, wherein the buffer comprises a video buffer.

28. The system of claim 25, further comprising a video decoder coupled receive to the video bit stream at the constant rate from the buffer.

29. The system of claim 28, wherein the video decoder skips decoding when the video buffer resumes outputting of the video bit stream, including the inserted error code, after the non-available condition is corrected, and wherein the video decoder resumes decoding when an initialization code is received in the video bitstream subsequent to the error code.

30. The system of claim 25, wherein the error code indicates a discontinuity in the video bit stream.

31. The system of claim 30, wherein the input circuit inserts the normal status code into the bit stream after insertion of the error code.

32. The system of claim 31 wherein the normal status is detected when the video decoder receives an initialization code in the video bit stream after receiving the error code in the video bit stream.

33. The system of claim 25, wherein the buffer maintains its data without resetting if the unavailable state occurs.

34. The system of claim 25, wherein the unavailable state indicates an overflow condition of the buffer.

35. The system of claim 25, wherein the unavailable state occurs when the buffer is filled to capacity, but before a data overflow.

* * * * *